United States Patent
Liu et al.

(10) Patent No.: US 9,329,830 B2
(45) Date of Patent: May 3, 2016

(54) MUSIC PLAYBACK METHOD, THIRD-PARTY APPLICATION AND DEVICE

(71) Applicant: TENCENT TECHNOLOGY (SHENZHEN) COMPANY LIMITED, Shenzhen (CN)

(72) Inventors: Rong Liu, Shenzhen (CN); Shilei Liu, Shenzhen (CN); Rong Zhang, Shenzhen (CN); Zhiping Feng, Shenzhen (CN); Meng Zhang, Shenzhen (CN); Yanbo Ma, Shenzhen (CN); Kun Zhang, Shenzhen (CN); Kuiguo Wang, Shenzhen (CN); Xiaopeng Huang, Shenzhen (CN); Lei Zheng, Shenzhen (CN); Renkui Shen, Shenzhen (CN); Songlin He, Shenzhen (CN); Chenguang Liu, Shenzhen (CN); Wei Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/295,518

(22) Filed: Jun. 4, 2014

(65) Prior Publication Data
US 2014/0309760 A1 Oct. 16, 2014

Related U.S. Application Data

(63) Continuation of application No. PCT/CN2012/086122, filed on Dec. 7, 2012.

(30) Foreign Application Priority Data

Dec. 7, 2011 (CN) .......................... 2011 1 0403595

(51) Int. Cl.
*G06F 17/00* (2006.01)
*G06F 3/16* (2006.01)
(Continued)

(52) U.S. Cl.
CPC ............ *G06F 3/165* (2013.01); *G06F 9/44521* (2013.01); *G11B 27/105* (2013.01)

(58) Field of Classification Search
CPC .......... G06F 17/30029; G06F 17/1671; G06F 3/0481; G06F 3/165; G06F 9/4443; G06F 9/44521; H04M 1/0235; H04M 1/72522; H04M 1/72558; H04M 1/72561
See application file for complete search history.

(56) References Cited

U.S. PATENT DOCUMENTS

2005/0091107 A1    4/2005  Blum
2007/0186758 A1    8/2007  Kim et al.
(Continued)

FOREIGN PATENT DOCUMENTS

CN    101098334 A    1/2008
CN    101283370 A    10/2008
(Continued)

OTHER PUBLICATIONS

International Preliminary Report on Patentability issued in Corresponding International Application No. PCT/CN2012/086122 dated Feb. 28, 2013.
(Continued)

*Primary Examiner* — Andrew C Flanders
(74) *Attorney, Agent, or Firm* — Fitzpatrick, Cella, Harper & Scinto

(57) ABSTRACT

The present disclosure relates to a music playback method, a third-party application and a device which are in the field of computer technique. The music playback method includes integrating a background music playback module into a third-party application, receiving a music playing signal in which a playlist identification is included, transmitting the music playing signal to the background music playback module through a predetermined port, acquiring by the background music playback module a corresponding playlist based on the playlist identification of the music playing signal, and randomly playing the music in the playlist by the background music playback module.

8 Claims, 8 Drawing Sheets

(51) Int. Cl.
*G06F 9/445* (2006.01)
*G11B 27/10* (2006.01)

(56) References Cited

U.S. PATENT DOCUMENTS

2008/0106513 A1 5/2008 Morotomi et al.
2010/0107069 A1 4/2010 Shiga

FOREIGN PATENT DOCUMENTS

| CN | 101719058 A | 6/2010 |
| CN | 101820468 A | 9/2010 |
| JP | 02121181 A | 5/1990 |
| JP | 2007104072 A | 4/2007 |
| JP | 2007134970 A | 5/2007 |
| JP | 2009145785 A | 7/2009 |
| JP | 2010103721 A | 5/2010 |
| KR | 100753804 B1 | 8/2007 |

OTHER PUBLICATIONS

Browser: FoxyTunes, Mac100%, Apr. 1, 2010, vol. 8, p. 62.
iPhone4 iOS4, Part 1, Aug. 24, 2010, pp. 82-83.
iOS SDK, Oct. 15, 2010, pp. 361 and 387.
Chinese Office Action issued in corresponding Chinese Application No. 201110403595.1 dated Mar. 31, 2015.

MUSIC PLAYBACK METHOD, THIRD-PARTY APPLICATION AND DEVICE

CROSS REFERENCE TO RELATED APPLICATION

This application is a continuation of International Application No. PCT/CN2012/086122, filed on Dec. 7, 2012, which claims priority to Chinese patent application No. 201110403595.1 filed in the SIPO on Dec. 7, 2011 with title of "MUSIC PLAYBACK METHOD, THIRD-PARTY APPLICATION AND DEVICE", the entire content of which is hereby incorporated by reference.

TECHNICAL FIELD

The disclosure relates to a music playback method, a third-party application and a device which are in the field of computer technique.

BACKGROUND ART

Music player is one of a plurality of applications which are used most frequently when people daily use a mobile terminal such as a mobile phone, a PDA (Personal Digital Assistant) and a tablet computer.

At present, a music player running in the mobile terminal is one that generally operates independently. Such music player has more comprehensive functions such as functions of locally playing music file, online playing music file, providing a user with classified online music, adjusting an audio equalizer, downloading and displaying album and lyrics and downloading music file, etc. Generally, when people are using a music player, they are used to run a third-party application which is not a music player and provides a visual experience such as entertainment or reading. Such third-party application may be a game application or a reading application, such as browser, micro-blog, and electronic book reader and so on.

However, in the prior art, to run a music player and a third-party application simultaneously in a mobile terminal, it is required that the mobile terminal shall has more large system resources such as computing performance, memory capacity and so on, otherwise, the mobile terminal may crash easily and its power drops rapidly. Specifically, when running a music player and a third-party application simultaneously, besides the playing function of the music player, other functions, such as the audio equalizer function operating in background, the function of downloading and displaying album and lyrics and the function of downloading music file, are always consuming a large part of the system resource which is not necessary for the user in listening the music. On the other hand, if the user runs the music player and a third-party application simultaneously, he/she shall switch back and forth between two application user interfaces (UI), which is very inconvenient for the user. Additionally, since the processing capacity of the mobile terminal is limited, a halting would occur very frequently during the switching between the two interfaces.

SUMMARY OF INVENTION

To reduce the resource consumption of the mobile terminal in running a music player and a third-party application simultaneously and allow users to easily listen to music and operate third-party applications simultaneously without switching between the two interfaces, the present disclosure provides a music playback method, third-party applications and devices. The technical solutions are as follows.

According an aspect of the present disclosure, an embodiment of the present disclosure provides a music playback method for a third-party application in which a background music playback module is integrated, said music playback method comprises receiving a music playing signal in which a playlist identification is included, transmitting the music playing signal to the background music playback module through a predetermined port, acquiring by the background music playback module a corresponding playlist based on the playlist identification of the music playing signal, and randomly playing the music in the playlist by the background music playback module.

According to another aspect of the present disclosure, an embodiment of the present disclosure provides a third-party application. The third-party application comprises: a signal receiving module configured to receive a playing signal in which a playlist identification is included; a signal transmitting module configured to transmit the playing signal to a background music playback module via a predetermined port; and a background music playback module including a playlist acquiring module which is configured to acquire a playlist based on based on the playlist identification of the music playing signal and a music playing module which is configured to randomly playing the music in the playlist acquired by the playlist acquiring module.

According to still another aspect of the present disclosure, an embodiment of the present disclosure provides a music playback method, which comprises receiving, from a third-party application, a music playing signal including a playlist identification by means of a predetermined port, acquiring a corresponding playlist based on the playlist identification of the music playing signal, and randomly playing the music in the playlist.

According to still another aspect of the present disclosure, an embodiment of the present disclosure provides a music playback device. The music playback device comprises: a first receiving module configured to receive, from a third-party application, a music playing signal including a playlist identification by means of a predetermined port, a first acquiring module configured to acquire a corresponding playlist based on the playlist identification of the music playing signal, and a playing module configured to randomly playing the music in the playlist.

According to the embodiments of the present disclosure, on the one hand, the resource occupancy of the mobile terminal in running a music player and a third-party application is reduced by only remaining core functions such as random playing function in the background music playing module and integrating the background music playing module in the third-party application. On the other hand, the user can easily listen to music and operate third-party applications simultaneously without switching between the two interfaces since the mobile terminal receives the relative music playing signal and other signals and then transmits them to the background music playing module.

BRIEF DESCRIPTION OF THE DRAWINGS

To describe the technical solution of the present disclosure more apparently, a plurality of drawings used in describing the embodiments will be briefly explained below. Obviously, the accompanying drawings briefly described below are some examples of the present disclosure and other drawings can be obtained by those of ordinary skill in the art based on the accompanying drawings without paying any inventive work.

DETAILED DESCRIPTION

Hereinafter, the embodiments of the present disclosure will be described in detail in conjunction with the accompanying drawings so as to make the technical solution and advantages of the present disclosure more apparent Embodiment 1

Figure 1:
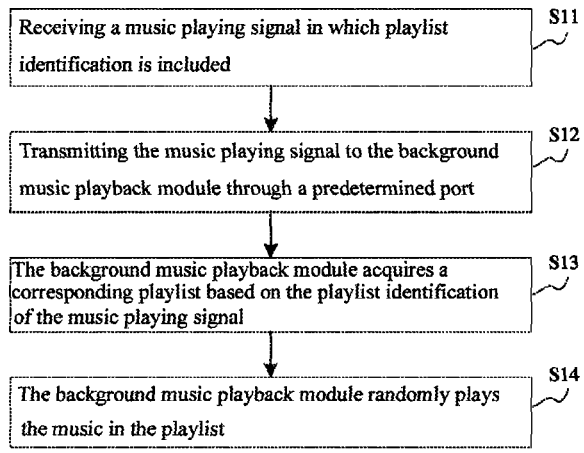
FIG. 1 is a flowchart of a music playback method according a first embodiment of the present disclosure.

Referring to FIG. 1, a flowchart of a music playback method according a first embodiment of the present disclosure is shown in the figure. In the embodiment of the present disclosure, a background music playback module is integrated in a third-party application. The music playback method comprises the following steps.

At Step S11, receiving a music playing signal in which playlist identification is included.

At Step S12, the music playing signal is transmitted to the background music playback module through a predetermined port.

At Step S13, the background music playback module acquires a corresponding playlist based on the playlist identification of the music playing signal.

At Step S14, the background music playback module randomly plays the music in the playlist.

In the embodiments of the present disclosure, an interface of the third-party application can be used to receive the music playing signal.

In summary, on the one hand, the music playback method provided by the present embodiment reduces the resource occupancy of the mobile terminal in running a music player and a third-party application simultaneously by only remaining core functions such as random playing function in the background music playing module and integrating the background music playing module in the third-party application.

On the other hand, the user are allowed to easily listen to music and operate third-party applications simultaneously without switching between the two interfaces by using the third-party application to receive the music playing signal and then transmit it to the background music playing module.

Embodiment 2

Figure 2:
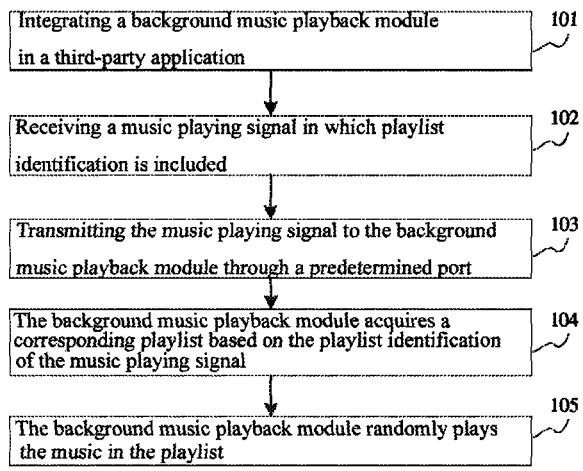
FIG. 2 is a flowchart of a music playback method according a second embodiment of the present disclosure.

Referring to FIG. 2, a flowchart of a music playback method according a second embodiment of the present disclosure is shown in the figure. The third-party application as described herein mainly refers to the one running in a mobile terminal and mainly providing a visual experience.

Such third-party application may be a game or reading application, such as browser, micro-blog, and electronic book reader and so on. The music playback method comprises the following steps.

At Step S101, a background music playback module is integrated in a third-party application.

Since, in the prior art, when running a music player and a third-party application simultaneously, besides the playing function of the music player, other functions, such as the audio equalizer function operating in background, the function of downloading and displaying album and lyrics and the function of downloading music file, are actually consuming a part of the system resource which is not necessary for the user in listening the music, it is possible to integrate in advance a lite version background music playing module which only remains core functions such as random playing function in the third-party application in order to reduce the resource occupancy of the mobile terminal in running a music player and a third-party application simultaneously. The background music playing module may receive control signal such as music playing signal, playing/pause signal, next one signal and so on and randomly play local music and online music by acquiring a playlist.

At Step S102, receiving a music playing signal in which playlist identification is included.

Figure 3:
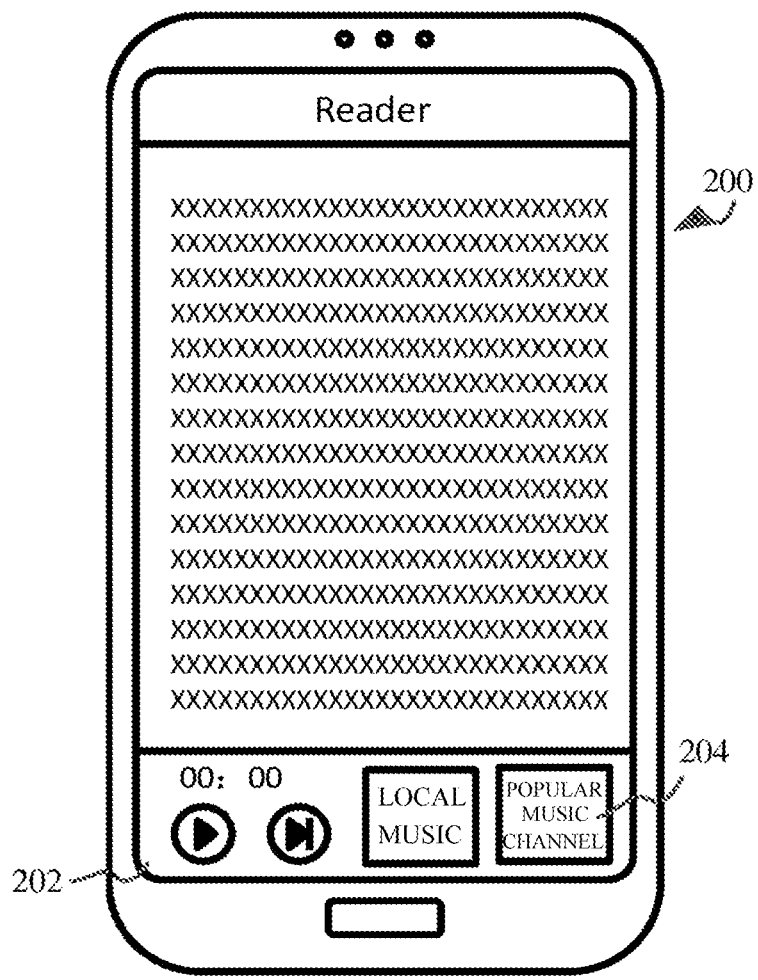
FIG. 3 is a schematic diagram of implementing the music playback method according a second embodiment of the present disclosure.

The third-party application in which the background music playing module is integrated may receive the music playing signal in which the playlist identification is included through itself interface. As shown in FIG. 3, the third-party application 200 may be a reading type application. A micro-area 202 in the interface of the third-party application has a first music control panel. The micro-area 202 is very smaller with respect to the interface of the third-party application and, subject to a rule that a reading area of the third-party application 200 is not disturbed, is often provided in the surround or the toolbar of the interface or displayed in a translucent and suspended manner on the main interface. Usually, the first music control panel only includes a "play/pause" icon, a "nest one" icon and at least one playlist signal receiving area 204 so that it occupies an area of the interface of the third-party application as small as possible. The playlist signal receiving area 204 may be a "local music" icon or a "popular music" icon as shown in FIG. 3. The "local music" icon may correspond to an identification of a list of songs which are stored locally in the mobile terminal itself while the "popular music" icon may correspond to an identification of a list of songs which are online. When a user wants to listen to music, he/she can click the "local music" icon or the "popular music" icon so that the third-party application receives a music playing signal in which a playlist identification corresponding to the playlist signal receiving area is included.

At Step S103, the music playing signal is transmitted to the background music playback module through a predetermined port.

The third-party application may transmit the music playing signal to the background music playing module by means of a predetermined port of the background music playing module after receiving the music playing signal. The predetermined port may be an API (Application Programming Interface) function interface of the background music playing module. Further, the background music playing module may use other predetermined port to receive other control signals, such as playing/pause signal, next one signal and so on.

At Step S104, the background music playback module acquires a corresponding playlist based on the playlist identification of the music playing signal.

The background music playback module can acquire a corresponding playlist based on the playlist identification of the music playing signal after receiving the music playing signal. For example, if the playlist identification included in the music playing signal corresponds to a playlist of local music, the background music playing module can acquire a playlist of local music from the mobile terminal. For another example, if the playlist identification included in the music playing signal corresponds to a playlist of popular music channel, the background music playing module can acquire a playlist of popular music channel from the network. At this time, the background music playing module acquires a corresponding playlist and follow-up music data by establishing a network connection with a predetermined music server. How to establish a network connection belongs to a known technique in the art and will not be described herein.

At Step S105, the background music playback module randomly plays the music in the playlist.

The background music playback module randomly plays the music in the playlist after receiving the playlist. It should be noted that, in general, the background music playback module need not have the third-party application display the related information of the playlist to the user, but have the third-party application display the name of song and other information on the micro-area in its interface. Therefore, the user cannot acquire the related information of the playlist by means of the interface of the third-party application. When the user does not want to listen the current song, he/she may touch the "next one" icon to have the background music playback module randomly play a next song.

In summary, on the one hand, the music playback method provided by the second embodiment reduces the resource occupancy of the mobile terminal in running a music player and a third-party application simultaneously by only remaining core functions such as random playing function in the background music playing module and integrating the background music playing module in the third-party application. On the other hand, the music playing method according to the second embodiment allow the user to easily listen to music and operate third-party applications simultaneously without switching between the two interfaces by using the third-party application to receive the music playing signal and then transmit it to the background music playing module by means of the predetermined port. It should be noted additionally that each playlist signal receiving area corresponds to playlist identification. The playlist may be a variety of playlists provided by the background music playing module, for examples, local music playlist, my favorite playlist and a playlist in online music playlist of different classes. The playlists can be classified into occident popular music, occident new music, China mainland popular music, China mainland new music, classic reminiscent music, love song collection, popular music channel and so on.

Embodiment 3

Figure 4:
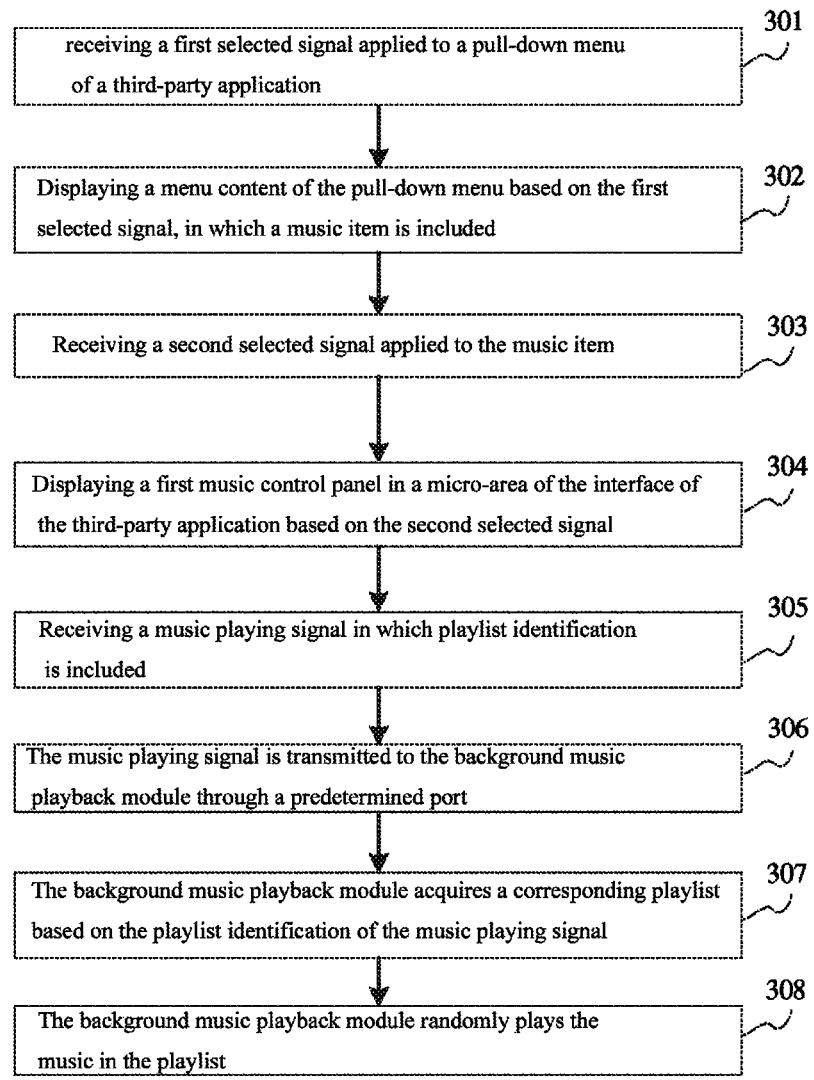
FIG. 4 is a flowchart of a music playback method according a third embodiment of the present disclosure.

Referring to FIG. 4, a flowchart of a music playback method according a third embodiment of the present disclosure is shown in the figure. A background music playback module is integrated in a third-party application in advance. The music playback method comprises the following steps.

At Step S301, receiving a first selected signal applied to a pull-down menu of a third-party application.

Figure 5:
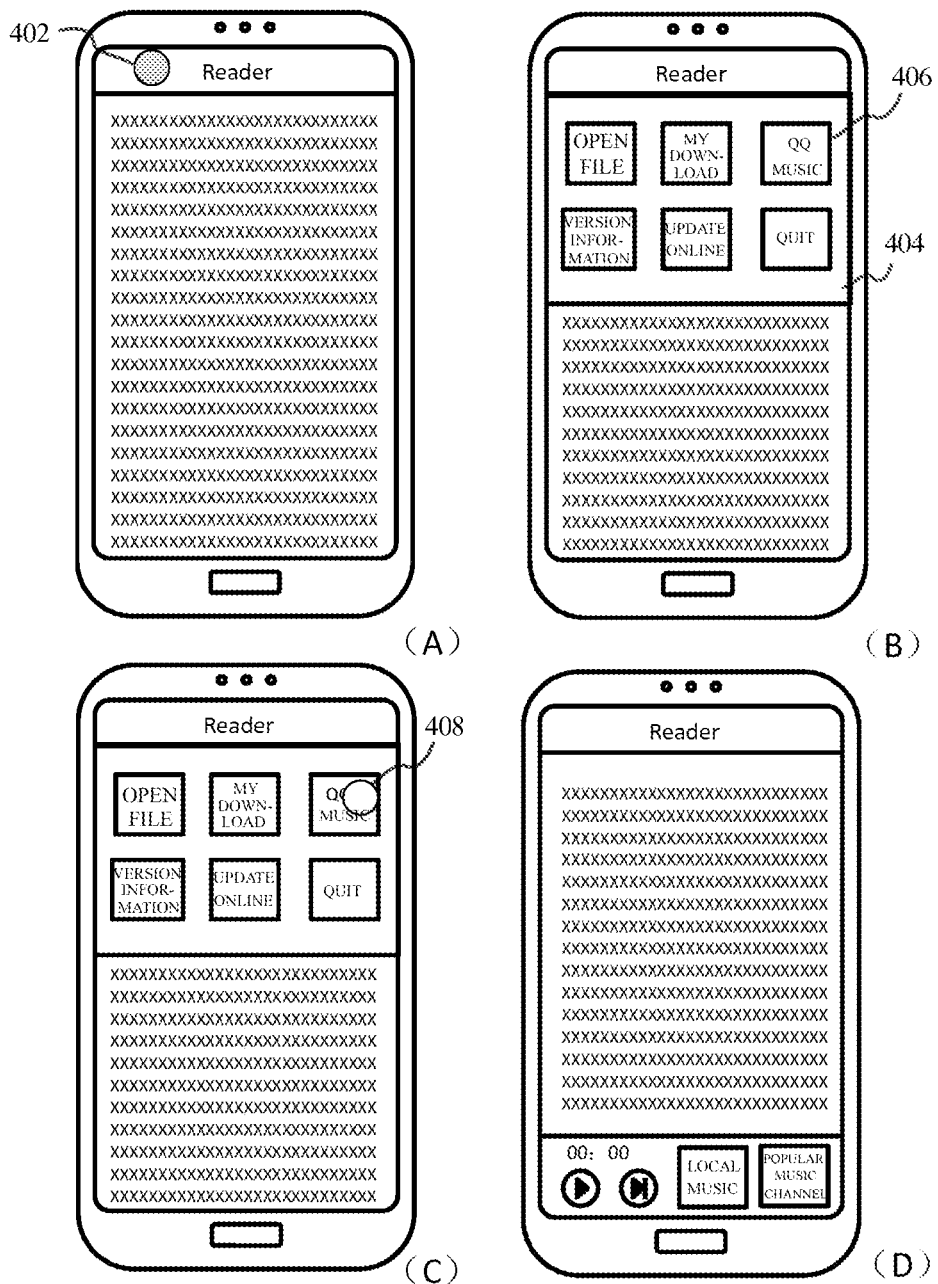
FIG. 5 is a schematic diagram of implementing the music playback method according the third embodiment of the present disclosure.

Since the user does not always have to listen to the music simultaneously when using the third-party application, the micro-area in the interface of the second embodiment may not be displayed in advance. When the user uses the third-party application, he/she may issue the first selected signal 402 to the pull-down menu of the third-party application, as shown in FIG. 5A. The third-party application may receive the first selected signal.

At Step S302, displaying a menu content of the pull-down menu based on the first selected signal, in which a music item is included.

The third-party application may display the menu content 404 of the pull-down menu based on the first selected signal after receiving the first selected signal and the menu content 404 includes the music item 406, as shown in FIG. 5B At step S303, receiving a second selected signal applied to the music item.

If the user wants to listen to the music at the same time of using the third-party application, he/she may issue the second selected signal 408 to the music item, as shown in FIG. 5C. The third-party application may receive the second selected signal.

For example, as shown in FIG. 5C, the third-party application includes music item "QQ music". The user may act on the music item "QQ music" by its finger (the circle as shown in FIG. 5C denotes the user's finger) to create a second selected signal 408 and then submit it to the third-party application.

At step S304, displaying a first music control panel in a micro-area of the interface of the third-party application based on the second selected signal.

The third-party application may display the first music control panel in the micro-area of its interface based on the second selected signal after receiving the second selected signal, as shown in FIG. 5D. Usually, the first music control panel only provides a "play/pause" icon, a "next one" icon and at least one playlist signal receiving area. The playlist signal receiving area may be a "local music" icon or a "popular music channel" icon as shown in FIG. 5D. The "local music" icon corresponds to identification of a music list which is locally stored in the mobile terminal and the "popular music channel" icon corresponds to identification of a certain music list on network.

At step S305, receiving a music playing signal in which playlist identification is included.

When a user wants to listen to music, he/she can click the "local music" icon or the "popular music channel" icon so that the third-party application receives a music playing signal in which a playlist identification corresponding to the playlist signal receiving area is included.

At step S306, the music playing signal is transmitted to the background music playback module through a predetermined port.

The third-party application may transmit the music playing signal to the background music playing module by means of a predetermined port of the background music playing module after receiving the music playing signal. The predetermined port may be an API (Application Programming Interface) function interface of the background music playing module. Further, the background music playing module may use other predetermined port to receive other control signals, such as playing/pause signal, next one signal and so on.

At step S307, the background music playback module acquires a corresponding playlist based on the playlist identification of the music playing signal.

The background music playback module can acquire a corresponding playlist based on the playlist identification included in the music playing signal after receiving the music playing signal. For example, if the playlist identification included in the music playing signal corresponds to a playlist of local music, the background music playing module can acquire a playlist of local music from the mobile terminal. For another example, if the playlist identification included in the music playing signal corresponds to a playlist of popular music channel, the background music playing module can acquire a playlist of popular music channel from the network. At this time, the background music playing module acquires a corresponding playlist and follow-up music data generally by establishing a network connection with a predetermined music server. The technical details of establishing a network connection belongs to a known technique in the art and will not be described herein.

At step S308, the background music playback module randomly plays the music in the playlist.

The background music playback module randomly plays the music in the playlist after receiving the playlist. It should be noted that, in general, the background music playback module need not have the third-party application display the related information of the playlist to the user, but have the third-party application display the name of song and other information on the micro-area in its interface. Therefore, the user cannot acquire the related information of the playlist by means of the interface of the third-party application. When the user does not want to listen the current song, he/she may trigger the "next one" icon to have the background music playback module randomly play a next song.

In summary, on the one hand, the music playback method provided by the third embodiment reduces the resource occupancy of the mobile terminal in running a music player and a third-party application simultaneously by only remaining core functions such as random playing function in the background music playing module and integrating the background music playing module in the third-party application. On the other hand, the music playing method according to the third embodiment allow the user to easily listen to music and operate third-party applications simultaneously without switching between the two interfaces by using the third-party application to receive the music playing signal and then transmit it to the background music playback module by means of the predetermined port. Further, the music playback method according to the third embodiment provides a more humanized interaction mode which improves the user's experience.

Embodiment 4

Figure 6:
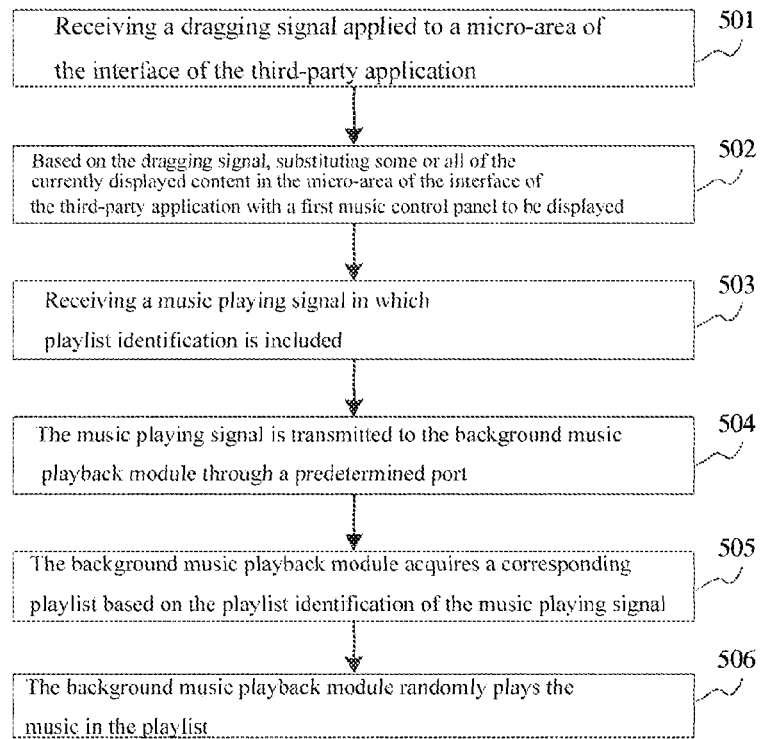
FIG. 6 is a flowchart of a music playback method according a fourth embodiment of the present disclosure.

Referring to FIG. 6, a flowchart of a music playback method according a fourth embodiment of the present disclosure is shown in the figure. A background music playback module is integrated in a third-party application in advance. The music playback method comprises the following steps.

At Step S501, receiving a dragging signal applied to a micro-area of the interface of the third-party application.

Figure 7:
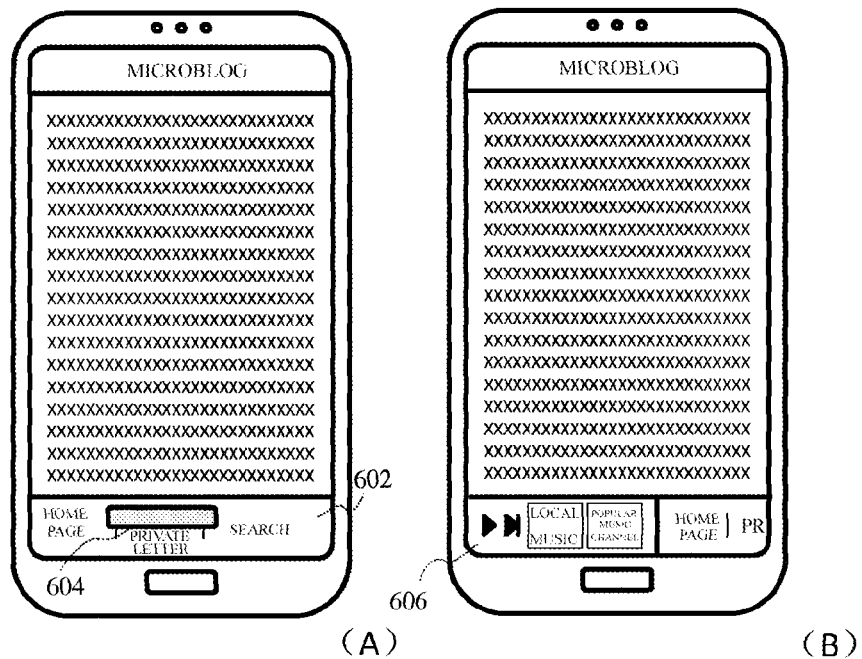
FIG. 7 is a schematic diagram of implementing the music playback method according the fourth embodiment of the present disclosure.

Since the user does not always have to listen to the music simultaneously when using the third-party application, the micro-area in the interface of the second embodiment may display other content in advance. When the user uses the third-party application, he/she may issue the dragging signal 604 to the micro-area in the interface of the third-party application, as shown in FIG. 7A. The third-party application may receive the dragging signal 604.

For example, referring to FIG. 7A, the user can perform a dragging action in the micro-area 602 with his/her finger so as to create the dragging signal 604 and then submit the dragging signal 604 to the third-party application.

At step S502, based on the dragging signal, substituting some or all of the currently displayed content in the micro-area of the interface of the third-party application with a first music control panel 606 to be displayed.

The micro-area displays related content of the third-party application in an initial state. After receiving the dragging signal 604, the third-party application can substitute some or all of the initially displayed content in the micro-area with a first music control panel 606 to be displayed based on the dragging signal 604, as shown in FIG. 7B. Usually, the first music control panel only provides a "play/pause" icon, a "next one" icon and at least one playlist signal receiving area. The playlist signal receiving area may be a "local music" icon or a "popular music channel" icon as shown in FIG. 7B. The "local music" icon corresponds to identification of a music list which is locally stored in the mobile terminal and the "popular music channel" icon corresponds to identification of a certain music list on network.

At step S503, receiving a music playing signal in which playlist identification is included.

When a user wants to listen to music, he/she can click the "local music" icon or the "popular music channel" icon so that the third-party application receives a music playing signal in which a playlist identification corresponding to the playlist signal receiving area is included.

At step S504, the music playing signal is transmitted to the background music playback module through a predetermined port.

The third-party application may transmit the music playing signal to the background music playing module by means of a predetermined port of the background music playing module after receiving the music playing signal. The predetermined port may be an API (Application Programming Interface) function interface of the background music playing module. Further, the background music playing module may use other predetermined port to receive other control signals, such as playing/pause signal, next one signal and so on.

At step S505, the background music playback module acquires a corresponding playlist based on the playlist identification of the music playing signal.

The background music playback module can acquire a corresponding playlist based on the playlist identification included in the music playing signal after receiving the music playing signal. For example, if the playlist identification included in the music playing signal corresponds to a playlist of local music, the background music playing module can acquire a playlist of local music from the mobile terminal. For another example, if the playlist identification included in the music playing signal corresponds to a playlist of popular music channel, the background music playing module can acquire a playlist of popular music channel from the network. At this time, the background music playing module acquires a corresponding playlist and follow-up music data generally by establishing a network connection with a predetermined music server. The technical details of establishing a network connection belongs to a known technique in the art and will not be described herein.

At step S506, the background music playback module randomly plays the music in the playlist.

The background music playback module randomly plays the music in the playlist after receiving the playlist. It should be noted that, in general, the background music playback module need not have the third-party application display the related information of the playlist to the user, but have the third-party application display the name of song and other information on the micro-area in its interface. Therefore, the user cannot acquire the related information of the playlist by means of the interface of the third-party application. When the user does not want to listen the current song, he/she may trigger the "next one" icon to have the background music playback module randomly play a next song.

In summary, on the one hand, the music playback method provided by the fourth embodiment reduces the resource occupancy of the mobile terminal in running a music player and a third-party application simultaneously by only remaining core functions such as random playing function in the background music playing module and integrating the background music playing module in the third-party application. On the other hand, the music playing method according to the fourth embodiment allow the user to easily listen to music and operate third-party applications simultaneously without switching between the two interfaces by using the third-party application to receive the music playing signal and then transmit it to the background music playing module by means of the predetermined port. Further, the music playback method according to the fourth embodiment provides a more humanized interaction mode which improves the user's experience.

Embodiment 5

Figure 8:
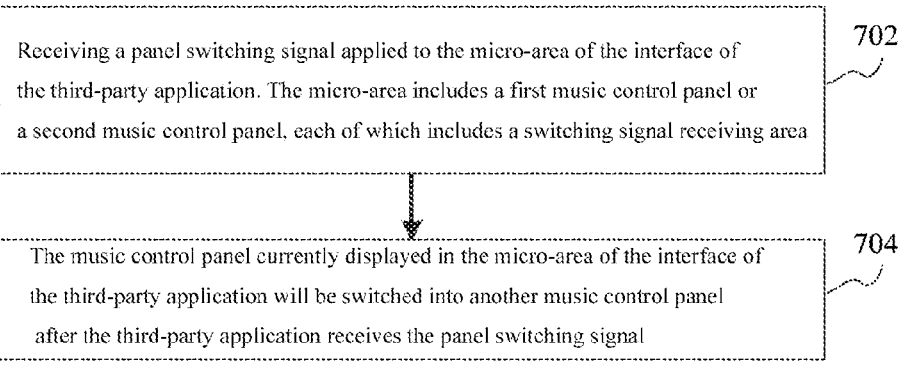
FIG. 8 is a flowchart of a music playback method according a fifth embodiment of the present disclosure.

Referring to FIG. 8, a flowchart of a music playback method according a fifth embodiment of the present disclosure is shown in the figure. The music playback method according the fifth embodiment may be used in combination with the music playback methods as described with respect to the third embodiment and the fourth embodiment. The music playback method comprises the following steps.

At step S702, receiving a panel switching signal applied to the micro-area of the interface of the third-party application. The micro-area includes a first music control panel or a second music control panel, each of which includes a switching signal receiving area.

Figure 9:
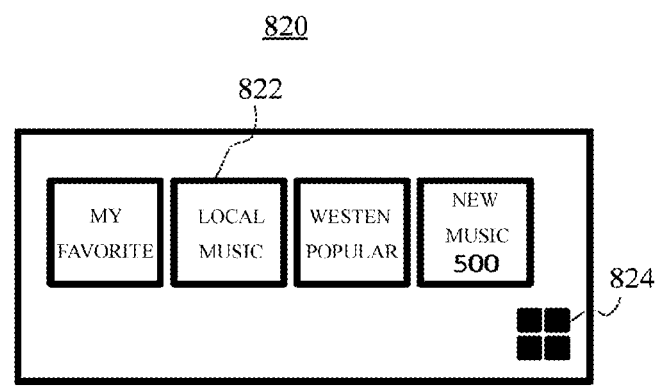
FIG. 9 is a schematic diagram of implementing the music playback method according the fifth embodiment of the present disclosure.
Figure 9:
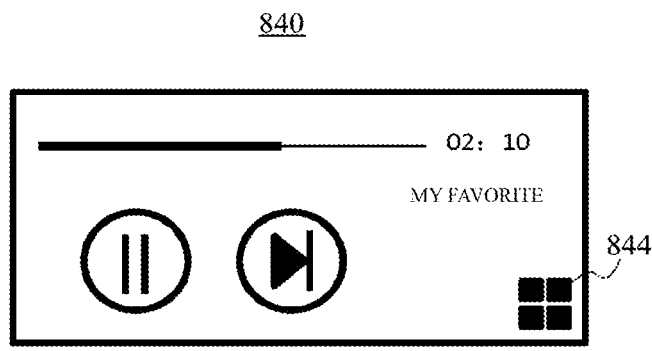

In order to make the area occupied in the interface of the third-party application by the micro-area associated with the control area of playing music smaller, two or more music control panels can be preset in advance. For example, the music panel may include a first music control panel 820 and a second music control panel 840. The first music control panel 820 includes at least one playlist signal receiving area 822 and a switching signal receiving area 824. In one particular embodiment, the first music control panel 820 may include four playlist signal receiving areas 822 and a switching signal receiving area 824, as shown in FIG. 9A. The second music control panel 840 may include a play/pause icon, a nest one icon and a switching signal receiving area 844, as shown in FIG. 9B. If, at initial state, the music control panel displays the second music control panel 840, the user can issue a panel switching signal to the switching signal receiving area 844 when he/she wants to select a channel. The third-party application can receives the panel switching signal.

At step S704, the music control panel currently displayed in the micro-area of the interface of the third-party application will be switched into another music control panel after the third-party application receives the panel switching signal.

The third-party application may switch the second music control panel 840 currently displayed in the micro-area of the interface into the first music control panel 820 after receiving the panel switching signal. In a similar way, when the user wants to issue other control signal, he/she can issue a panel switching signal to the switching signal receiving area in the first music control panel 820 so as to switch the first music control panel 820 into the second music control panel 840.

If the music playback method according to the fifth embodiment is used in combination with the music playback method according to previous embodiments, the micro-area of the interface of the third-party application may display any one of the first music control panel and the second music control panel when it firstly displays the music control panel, and then switch it display based on the user requirements. It is conceived for the person in the art that the number of the music control panels is not limited to two but more than two.

In summary, the music playback method according to the fifth embodiment further reduces the resource occupancy of the micro-area and may be used in combination with the music playback method according to previous embodiments. It shall be noted additionally that, since the background music playing modules of the music playback methods according to embodiments above have a function of playing online music, if these music playback methods are applied to a third-party application such as social application, micro-blog application or webpage browser and content displayed in these third-party applications includes a music link which is searched or shared by other user, those music playback methods may further comprises receiving a third selected signal applied to the music link in the interface of the third-party application, transmitting the music link to a background music playing module through a predetermined port after receiving the third selected signal, acquiring music data by the background music playing module based on the music link, and playing the music by the background music playing module based on the acquired music data. For example, in the micro-blog client to which the music playback method is applied, if user A notices a music link of "XX symphony" in the micro-blog content which is shared by user B, user A can click the music link so that the micro-blog client receives the click signal and automatically triggers the background music playing module to play the song corresponding to the music link.

Embodiment 6

Figure 10:
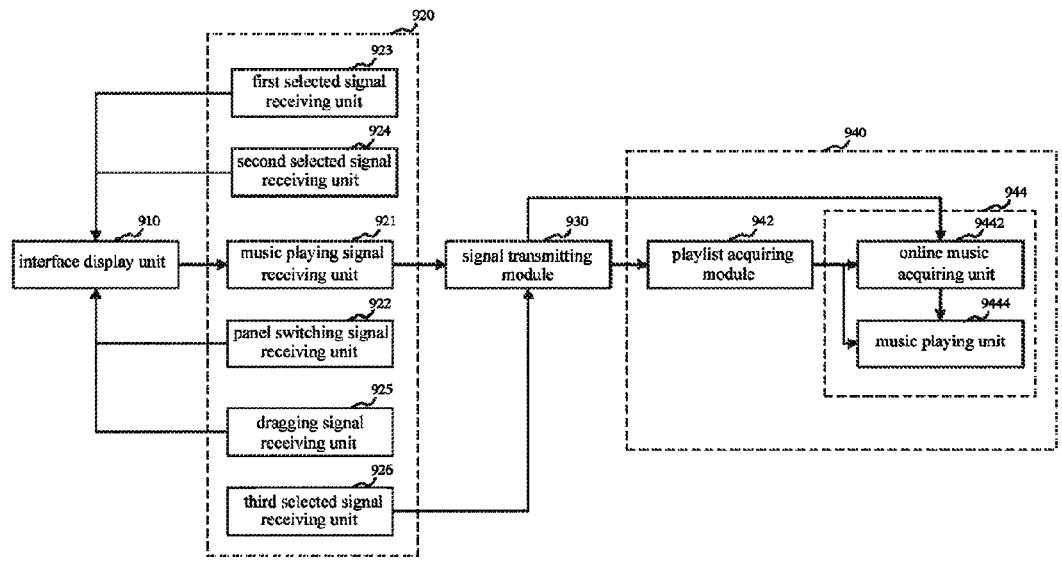
FIG. 10 is a structural block diagram of a third-party application according a sixth embodiment of the present disclosure.

Referring to FIG. 10 which shows structural block diagram of a third-party application according a sixth embodiment of the present disclosure, the third-party application integrates with a background music playing module. The third-party application comprises an interface display unit 910, a signal receiving module 920, a signal transmitting module 930, and a background music playing module 940 including a playlist acquiring module 942 and a music playing module 944.

The interface display unit 910 is configured to display an interactive interface of the third-party application.

The signal receiving module 920 is configured to receive a variety of signals triggered through the interactive interface of the third-party application. For example, in one embodiment, the signal receiving module 920 may include a music playing signal receiving unit 921. The music playing signal receiving unit 921 is configured to receive a music playing signal applied to a micro-area in the interface of the third-party application which is displayed by the interface display unit 910. The micro-area in the interface of the third-party application which is displayed by the interface display unit 910 contains a first music control panel including at least one playlist signal receiving areas, each of which corresponds to playlist identification.

The signal transmitting module 930 may transmit a music playing signal to a background playing module 930 through a predetermined port.

The playlist acquiring module 942 may acquire a corresponding playlist based on the playlist identification in the music playing signal transmitted from the signal transmitting module 930.

The music playing module 944 may randomly play the music in the playlist acquired by the playlist acquiring module 942. Specifically, the music playing module 944 includes an online music acquiring unit 9442 and a music playing unit 9444. The online music acquiring unit 9442 may acquire online music data and the music playing unit 9444 may play the music based on the music data. The music data may be local music data or online music data acquired by the online music acquiring unit 9442.

In another embodiment, the signal receiving module 920 further includes a panel switching signal receiving unit 922. The panel switching signal receiving unit 922 is configured to receive a panel switching signal applied to a micro-area in the interface of the third-party application which is displayed by the interface display unit 910. The micro-area in the interface of the third-party application which is displayed by the interface display unit 910 contains a first music control panel and a second music control panel. Each of the first music control panel and the second music control panel includes a panel switching signal receiving area. The interface display unit 910 in the embodiment is further configured to switch the music control panel currently displayed in the micro-area of the interface of the third-party application into another music control panel.

In a still another embodiment, the signal receiving module 920 further includes a first selected signal receiving unit 923 and a second selected signal receiving unit 924. The first selected signal receiving unit 923 is configured to receive a first selected signal applied to a pull-down menu of the third-party application which is displayed by the interface display unit 910. Then, the interface display unit 910 in the embodiment is further configured to display the menu content of pull-down menu based on the first selected signal and the menu content contains music items. The second selected signal receiving unit 924 is configured to receive a second selected signal applied to the music items. The interface display unit 910 is further configured to display the first music control panel or the second music control panel in the micro-area of the interface of the third-party application based on the second selected signal.

In a still another embodiment, the signal receiving module 920 further includes a dragging signal receiving unit 925. The dragging signal receiving unit 925 is configured to receive a dragging signal applied to the micro-area of the interface of the third-party application which is displayed by the interface display unit 910. The interface display unit 910 is further configured to, based on the dragging signal, substitute some or all of the currently displayed content in the micro-area of the interface of the third-party application with a first music control panel or a second music control panel to be displayed.

In a still another embodiment, the signal receiving module 920 further includes a third selected signal receiving unit 956. The third selected signal receiving unit 956 is configured to receive a third selected signal applied to a music link in the interface of the third-party application which is displayed by the interface display unit 910. The signal transmitting module 930 is further configured to transmit the music link to the online music acquiring unit 9442 through a predetermined port after the third selected signal receiving unit 956 receives the third selected signal. The online music acquiring unit 9442 is further configured to acquire music data based on the music link transmitted from the signal transmitting module 930. The music playing unit 9444 is configured to play the music based on the music data acquired by the online music acquiring unit 9442.

In summary, on the one hand, the third-party application according to the sixth embodiment reduces the resource occupancy of the mobile terminal in running a music player and a third-party application simultaneously by only remaining core functions such as random playing function in the background music playing module and integrating the background music playing module in the third-party application. On the other hand, the third-party application according to the sixth embodiment allows the user to easily listen to music and operate third-party applications simultaneously without switching between the two interfaces by using the third-party application to receive the music playing signal and other control signals and then transmit them to the background music playing module.

Embodiment 7

Figure 11:
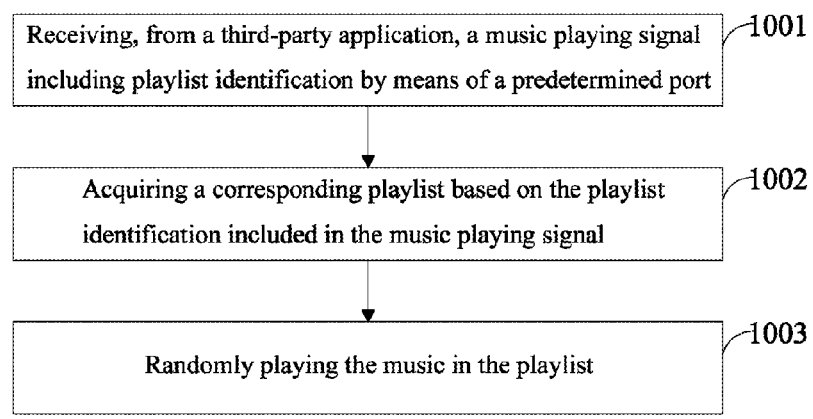
FIG. 11 is a schematic diagram of implementing the music playback method according the seventh embodiment of the present disclosure.

Referring to FIG. 11 which shows a flowchart of a music playback method according a seventh embodiment of the present disclosure, the music playback method comprises receiving, from a third-party application, a music playing signal including playlist identification by means of a predetermined port (step S1001), acquiring a corresponding playlist based on the playlist identification included in the music playing signal (step S1002), and randomly playing the music in the playlist (step S1003).

The music playback method further comprises receiving a music link transmitted from the third-party application via a predetermined port, acquiring music data based on the music link, and playing the music based on the acquired music data.

The present embodiment allows the user to easily listen to music and operate third-party applications simultaneously without switching between the two interfaces by using the predetermined port to receive the music playing signal from the third-party application, acquiring a corresponding playlist based on the music playing signal and then randomly playing the music in the playlist.

Embodiment 8

Figure 12:
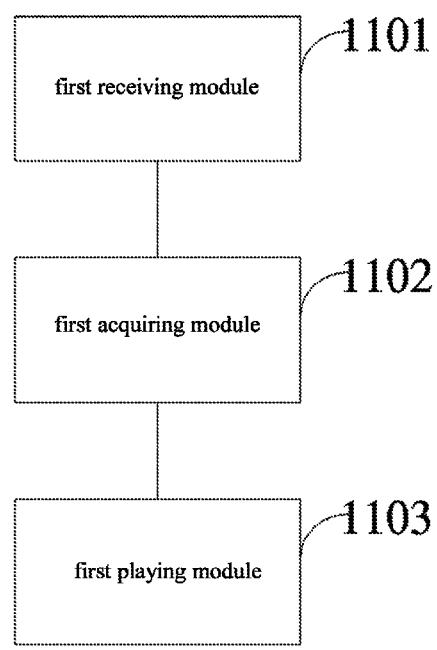
FIG. 12 is a structural block diagram of a music playback device according an eighth embodiment of the present disclosure.

Referring to FIG. 12 which shows a structural block diagram of a music playback device according an eighth embodiment of the present disclosure, the music playback device comprises a first receiving module 1101 configured to receive, from a third-party application, a music playing signal including playlist identification by means of a predetermined port, a first acquiring module 1102 configured to acquire a corresponding playlist based on the playlist identification included in the music playing signal, and a first playing module configured to randomly play the music in the playlist.

The music playback device further comprises a second receiving module configured to receive a music link transmitted from the third-party application via a predetermined port, a second acquiring module configured to acquire music data based on the music link, and a second playing module configured to play the music based on the acquired music data.

The present embodiment allows the user to easily listen to music and operate third-party applications simultaneously without switching between the two interfaces by using the predetermined port to receive the music playing signal from the third-party application, acquiring a corresponding playlist based on the music playing signal and then randomly playing the music in the playlist.

It should be noted that the third-party application in the sixth embodiment is only exemplified in a plurality of function modules. In fact, as required, the above functions may be implemented by different module. That is, the internal structure of the device is divided into different function module to implement some or all of the function mentioned above. In addition, the third-party application according to the embodiment above has the same concept as those of previous method embodiments and its specific implementing process may refer to the method embodiments and will be omitted herein.

It shall be understood by the person skilled in the art that some or all steps of the above embodiments may be implemented by hardware or a computer program instructing relevant hardware. Said program may be stored in a computer-readable storage medium, and said storage medium would include a read-only memory (ROM), a magnetic disk, and a CD (compact disc) and so on.

The descriptions of the various embodiments of the present invention have been presented only for purposes of illustration, but are not intended to be exhaustive or limited to the embodiments disclosed. All the modifications, equivalent substitutions and improvements that are made without departing from the scope and spirit of the described embodiments fall in the scope of the present application.

The invention claimed is:

1. A music playback method for a third-party application in which a background music playback module is integrated, comprising:
    receiving a music playing signal, the music playing signal including playlist identification, wherein the step of receiving a music playing signal comprises receiving the music playing signal applied to a micro-area in an interface of the third-party application, wherein the micro-area contains a first music control panel including at least one playlist signal receiving area, each playlist signal receiving area corresponding to one playlist identification;
    transmitting the music playing signal to the background music playback module through a predetermined port;
    acquiring by the background music playback module a corresponding playlist based on the playlist identification of the music playing signal;
    randomly playing the music in the playlist by the background music playback module; and
    receiving a dragging signal applied to the micro-area of the interface of the third-party application and, based on the dragging signal, substituting some or all of the currently displayed content in the micro-area of the interface of the third-party application with a first music control panel to be displayed.

2. The music playback method according to claim 1, further comprising:
    before receiving the music playing signal applied to a micro-area in the interface of the third-party application, receiving a panel switching signal applied to the micro-area of the interface of the third-party application, wherein the micro-area includes a first music control panel or a second music control panel, each of which includes a switching signal receiving area; and
    switching the music control panel currently displayed in the micro-area of the interface of the third-party application into another music control panel after receiving the panel switching signal.

3. The music playback method according to claim 1, further comprising:
    receiving a first selected signal applied to a pull-down menu of a third-party application;
    displaying a menu content of the pull-down menu based on the first selected signal, the menu content including a music item;
    receiving a second selected signal applied to the music item; and
    displaying the first music control panel or the second music control panel in the micro-area of the interface of the third-party application based on the second selected signal.

4. The music playback method according to claim 1, further comprising:
    receiving a third selected signal applied to a music link in the interface of the third-party application;
    transmitting the music link to a background music playing module through a predetermined port after receiving the third selected signal;
    acquiring music data by the background music playing module based on the music link; and
    playing the music by the background music playing module based on the acquired music data.

5. A music playback device having a third party application in which a background music playback module is integrated, comprising:
    a processor; and
    a memory including instructions that, when executed by the processor, are configured to cause the music playback device to perform a method including steps of:
        receiving a music playing signal, the music playing signal including a playlist identification;
        transmitting the music playing signal to the background music playback module through a predetermined port;
        acquiring by the background music playback module a corresponding playlist based on the playlist identification of the music playing signal; and
        randomly playing the music in the playlist by the background music playback module,
        wherein the step of receiving a music playing signal comprises receiving the music playing signal applied to a micro-area in the interface of the third-party application, wherein the micro-area contains a first music control panel including at least one playlist signal receiving area, each of the at least one playlist signal receiving areas corresponding to one playlist identification, and
    the method further including steps of:
        receiving a dragging signal applied to the micro-area of the interface of the third-party application; and
        based on the dragging signal, substituting some or all of the currently displayed content in the micro-area of the interface of the third-party application with a first music control panel to be displayed.

6. The music playback device according to claim 5, wherein the instructions in the memory are further configured to cause the music playback device to perform steps of:
    receiving a first selected signal applied to a pull-down menu of the third party application;
    displaying a menu content of the pull-down menu based on the first selected signal, the menu content including a music item;
    receiving a second selected signal applied to the music item; and displaying the first music control panel or a second music control panel in the micro-area of the interface of the third party application based on the second selected signal.

7. The music playback device according to claim 5, wherein the instructions in the memory are further configured to cause the music playback device to perform steps of:
receiving a third selected signal applied to a music link in the interface of the third party application;
transmitting the music link to the background music playing module through the predetermined port after receiving the third selected signal;
acquiring music data by the background music playing module based on the music link; and
playing the music by the background music playing module based on the acquired music data.

8. The music playback device according to claim 5, wherein the instructions in the memory are further configured to cause the music playback device to perform steps of:
before receiving the music playing signal applied to a micro-area in the interface of the third-party application, receiving a panel switching signal applied to the micro-area of the interface of the third-party application, wherein the micro-area includes a first music control panel or a second music control panel, each of which includes a switching signal receiving area; and
switching the music control panel currently displayed in the micro-area of the interface of the third-party application into another music control panel after receiving the panel switching signal.

\* \* \* \* \*